United States Patent [19]

Schüppert

[11] Patent Number: 5,252,514

[45] Date of Patent: Oct. 12, 1993

[54] PROCESS FOR PRODUCING A LOW-LOSS OPTICAL WAVEGUIDE IN AN EPITAXIAL SILICON FILM

[75] Inventor: Bernd Schüppert, Berlin, Fed. Rep. of Germany

[73] Assignee: Siemens Aktiengesellschaft, Munich, Fed. Rep. of Germany

[21] Appl. No.: 781,249

[22] PCT Filed: Jun. 29, 1990

[86] PCT No.: PCT/DE90/00497

§ 371 Date: Mar. 2, 1992

§ 102(e) Date: Mar. 2, 1992

[87] PCT Pub. No.: WO91/00534

PCT Pub. Date: Jan. 10, 1991

[30] Foreign Application Priority Data

Jun. 30, 1989 [DE] Fed. Rep. of Germany ....... 3922009

[51] Int. Cl.$^5$ .............................................. H01L 21/20
[52] U.S. Cl. .................................... 437/131; 437/162; 148/DIG. 30; 148/DIG. 35
[58] Field of Search ............... 437/131, 161, 162, 179; 148/DIG. 3, DIG. 30, DIG. 35, DIG. 36, DIG. 37, DIG. 59

[56] References Cited

U.S. PATENT DOCUMENTS 4,199,386  4/1980  Rosnowski et al. ................ 437/162

FOREIGN PATENT DOCUMENTS

86/06847  11/1986  World Int. Prop. O. .

OTHER PUBLICATIONS

Optics Letters, vol. 13, No. 2, Feb. 1988, Optical Society of America; B. N. Kurdi et al.: *Optical Waveguides in oxygen-implanted buried-oxide silicon-on-insulator structures*, pp. 175–177.

IEEE Journal of Quantum Electronics, vol. QE-22, No. 6, Jun. 1986, R. A. Soref et al.: *All-Silicon Active and Passive Guided-Wave Components for $\lambda = 1.3$ and 1.6 $\mu$m*, pp. 873–879.

*Primary Examiner*—Olik Chaudhuri
*Assistant Examiner*—Ramamohan Rao Paladugu
*Attorney, Agent, or Firm*—Kenyon & Kenyon

[57] ABSTRACT

A process for the production of a low-loss optical waveguide in an epitaxial silicon film is employed to form a silicon structural element with integrated electronic components in a silicon substrate. Between the silicon substrate and the epitaxial silicon film is an insulating film. The epitaxial film consists of silicon-on-insulator (SOI) material, which is an uncommon material. In order to carry out this process relatively cheaply, a lightly doped epitaxial silicon film is applied to the silicon substrate. A substance germanium and having a refractive index with a real component higher than that of silicon is diffused into the epitaxial silicon film.

6 Claims, 2 Drawing Sheets

PROCESS FOR PRODUCING A LOW-LOSS OPTICAL WAVEGUIDE IN AN EPITAXIAL SILICON FILM

BACKGROUND OF THE INVENTION

The invention relates to a process for the production of a low-loss optical waveguide in an epitaxial silicon film of a silicon structural element with integrated electronic components in a silicon substrate.

Such a method is described in "Optics Letters," Vol. 13, No. 2, 1988, pages 175 to 177. In this known method for the production of an optical waveguide in an epitaxial silicon film of a silicon structural element, an insulating layer of $SiO_2$ or $Al_2O_3$ is provided between the silicon substrate and the epitaxial silicon film; the epitaxial film is formed of a "silicon-on-insulator" (SOI) material. The optical waveguide is made complete by the fact that in the known method, a so-called rib waveguide is formed by etching, as described in detail in "IEEE Journal of Quantum Electronics," Vol. QE-22, No. 10, 1986, pages 873 to 879. Lateral waveguiding is achieved in this manner. An advantage of an optical waveguide produced in this way is that interactions between an electrical field and an optical field are possible by means of charge carrier injections. In addition, the waveguide is very low-loss, in advantageous manner, because its attenuation is less than 1 dB/cm. However, there are difficulties in the production of such an optical waveguide, in that the SOI material, which is rather rare until now, must be used to produce it.

SUMMARY OF THE INVENTION

Furthermore, a process for the production of a waveguide in a lithium-niobium substrate is known, in which a photoresist layer is applied to partial areas of the surface of the substrate. Subsequently, a thin titanium coating is applied to these partial areas, and to the areas of the substrate surface which are free of the layer, and after removal of the photoresist layer, this coating remains only at those locations on the substrate where the photoresist layer was not present before. Subsequently, the remaining titanium coating is diffused into the substrate, forming the waveguide.

The invention provides a method for the production of a low-loss, optical waveguide in an epitaxial silicon film of a silicon structural element, with which an optical waveguide with low attenuation can be produced in comparatively inexpensive manner, using an integrated construction method.

To accomplish this task, according to the invention, in a process of the type indicated at the beginning, the weakly doped epitaxial silicon film is applied to the silicon substrate, and a substance containing germanium and having a refractive index with a real component higher than that of silicon, is applied to the epitaxial silicon film and diffused in under the effect of heat.

An advantage of the process according to the invention consists of the fact that due to the use of widely available substances, it can be carried out with little expenditure, and makes it possible to obtain an optical waveguide which has the property, in addition to low attenuation, that an interaction between an electrical field and an optical field can be achieved by means of charge carrier injection. In this way, additional losses due to free charge carriers are avoided, by using the substance containing germanium. The weak doping of the epitaxial silicon film $< 10^{16}/cm^3$ results in sufficiently low attenuations in the optical waveguide.

In the process according to the invention, germanium itself can be used as the substance. However, it must be taken into consideration in this that due to the low diffusion constant of germanium in silicon, a high process temperature of approximately 1200° C. is required, which is higher than the melting temperature of germanium; the melting temperature of germanium is 937° C. Accordingly, non-homogeneities might form due to germanium-silicon alloy drops, which can lead to an absorption of the optical wave in the waveguide.

It is viewed as particularly advantageous in this connection if in another embodiment of the process according the invention, a $Ge_xSi_{(1-x)}$ alloy is used as the substance. In this connection, care is necessary to ensure that this alloy has a higher melting temperature than germanium. An optical waveguide produced with this substance can then be structured very homogeneously.

In the process according to the invention, it has furthermore proven to be advantageous if the substance is applied to the epitaxial silicon film in strips, according to the desired progression of the waveguide. This can be done, for example, by vacuum evaporating a $Ge_xSi_{(1-x)}$ alloy on after applying a photoresist layer.

In the process according to the invention, it is advantageous if the epitaxial film is provided with a $SiO_2$ coating on its surface which carries the substance, before it is diffused into the film, regardless of whether the substance is applied to the epitaxial silicon film as a solid or as a melt.

It is furthermore considered advantageous if in the process according to the invention, the silicon structural element is exposed to the diffusion temperature for several hours, under protective gas, and the $SiO_2$ coating is subsequently etched away.

DETAILED DESCRIPTION

Figure 2:
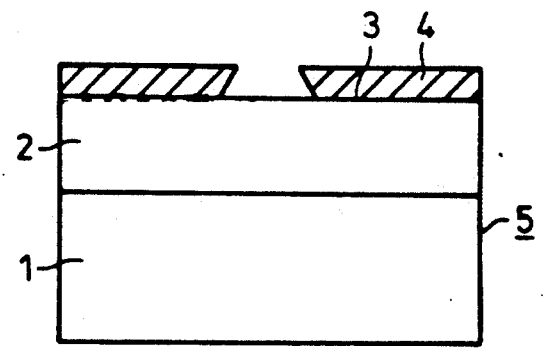

As FIG. 2 shows, an epitaxial silicon film 2 is applied to a silicon substrate 1; this film is weakly doped to achieve sufficiently low attenuations, in other words demonstrates a doping of $< 10^{16}/cm^3$, for example. On the surface 3 of the epitaxial silicon film 2 which faces away from the silicon substrate 1, a photoresist layer 4 is applied in a structure which corresponds to the progression of the optical waveguide to be created. In this connection, it is advantageous if the photoresist coating consists of a reversible photoresist, with which the edges evident in FIG. 2, which are drawn towards the inside, can be achieved in known manner. The negative steepness of these edges allows the structuring of greater layer thicknesses, as they are required for implementation of the process according to the invention for application of the substance as a diffusion source.

Figure 3:
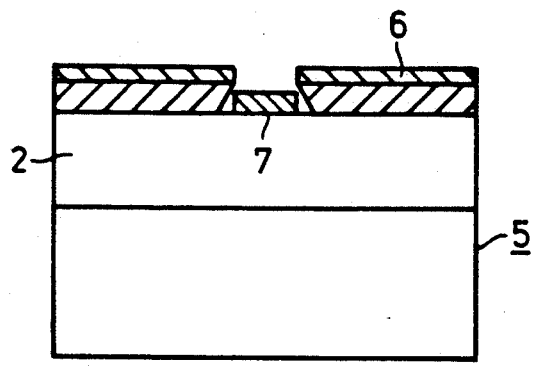

The silicon structural element 5 treated up to this point is subsequently brought into a high-vacuum unit and surface-cleaned there by glowing. Subsequently, evaporation with a $Ge_xSi_{(1-x)}$ alloy takes place in the high-vacuum unit, at a pressure of less than $10^{-7}$ mbar, which causes a layer 6 of such an alloy to be formed both on the photoresist layer 4 and on the area 7 of the epitaxial silicon film 2 which is free of the photoresist, as shown in FIG. 3.

The $Ge_xSi_{(1-x)}$ alloy can be produced in different ways, in this connection. One method is that an electron beam is deflected between a melt crucible filled with germanium and one filled with silicon, where the alloy ratio x can be adjusted by the pulse-duty factor. The beam deflection is typically carried out at a frequency of one Hz.

It is also possible, however, to produce the alloy by an alternating layer construction of germanium and silicon.

If, for example, it is being considered, within the scope of the process according to the invention, to produce a channel with a depth of approximately 3 μm and an increase in the index of refraction of 1% in the epitaxial silicon film 2, then a layer thickness of the substance of about 55 nm is required for this if pure germanium is being used, in other words a substance with an alloy ratio x=100% germanium. For a different alloy ratio x, the layer thickness must be increased by the reciprocal value of x, in other words, a layer thickness of about 550 nm must be selected for an alloy with x=10% germanium.

Figure 4:
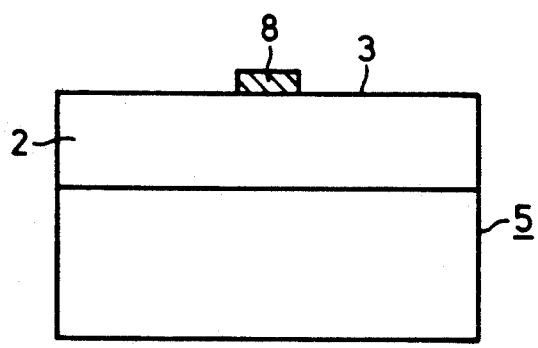

After evaporation onto the silicon structural element 5 in the high-vacuum unit, the structural element is removed from it and subsequently exposed to an organic solvent to remove the photoresist layer 4, with the removal being supported by application of ultrasound, if necessary. Only a strip 8 of the $Ge_xSi_{(1-x)}$ alloy then remains on the side 3 of the epitaxial silicon film 2 as the diffusion source. The silicon structural element 5 treated up to this point is shown in FIG. 4.

Figure 5:
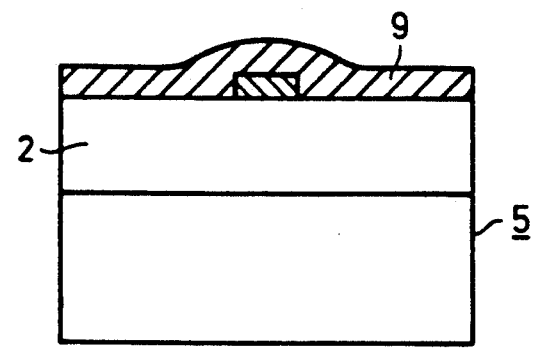

Subsequently, the silicon structural element 5 is covered with a $SiO_2$ layer 9, using a high-frequency sputter unit, on the surface 3 of the epitaxial silicon film 2 which carries the substance, i.e. the diffusion source, with a thickness of about 600 nm being selected for this layer (cf. FIG. 5). In this connection, the silicon structural element can be heated to about 200° C. in order to increase the packing density of the $SiO_2$ layer during sputtering.

Figure 6:
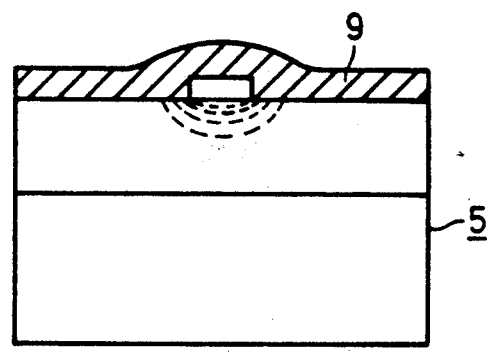

Subsequently, the silicon structural element 5 is diffused at a temperature of 1200° C. for a period of several hours, for example 50 hours, under flowing argon with a flow rate of approximately 0.5 l/min, so that then the silicon structural element 5 demonstrates a condition as shown in FIG. 6. The substance 8 has diffused into the epitaxial silicon film 2.

Figure 7:
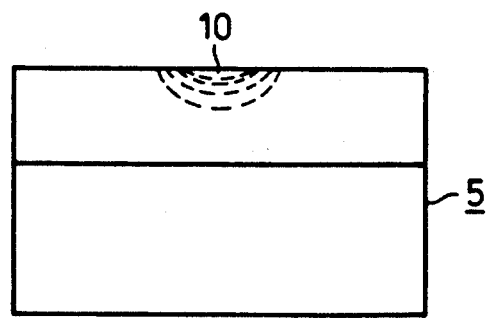

Finally, as the last process step, the $SiO_2$ layer is etched away with hydrofluoric acid, and a germanium-doped channel 10 with an increased index of refraction has been formed in the silicon structural element 5 as a low-loss optical waveguide, as shown in FIG. 7.

Figure 1:
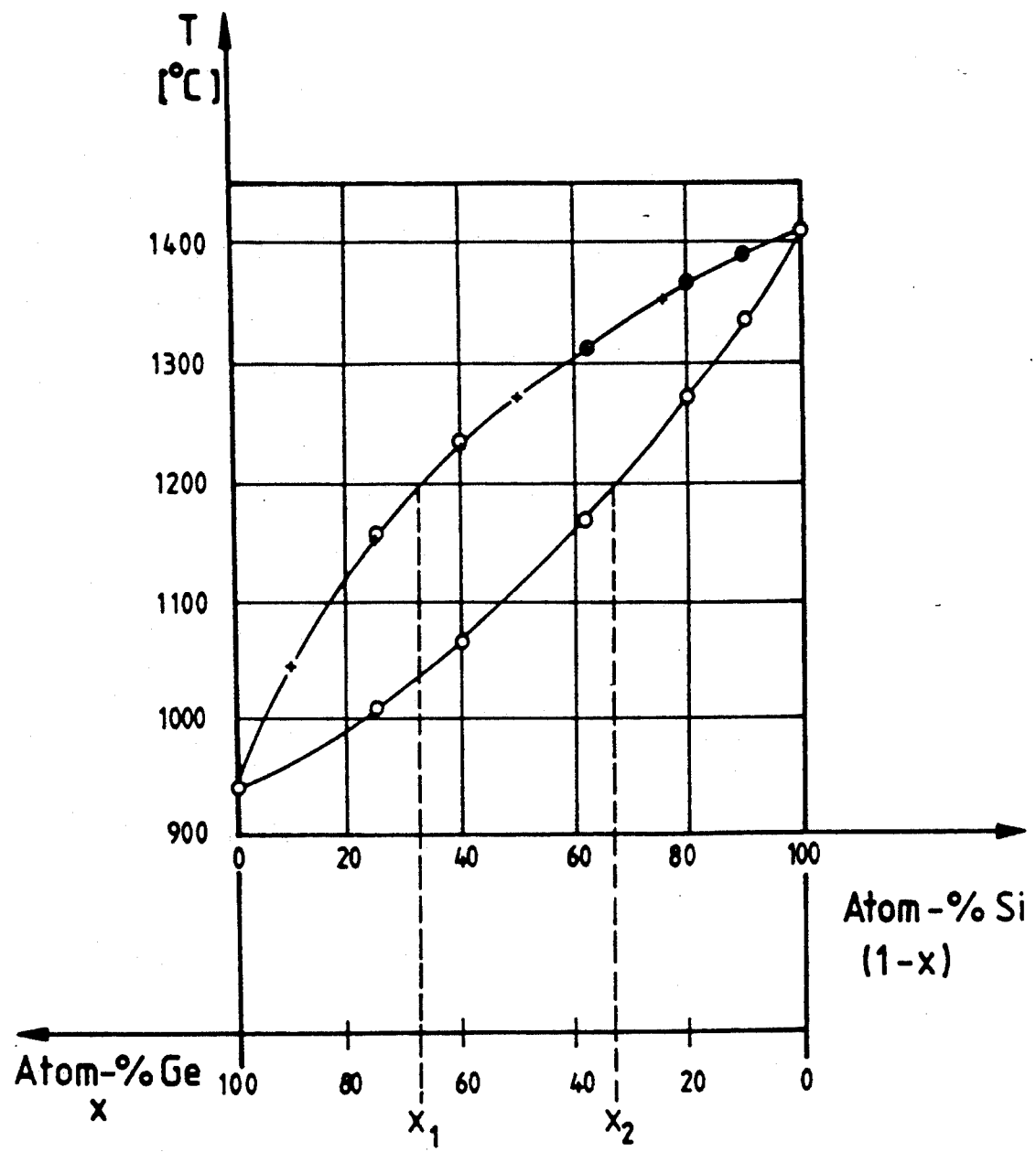
FIG. 1 shows a germanium-silicon status diagram and FIGS. 2 to 7 show the process according to the invention in its individual steps.

It was already pointed out above that it appears to be particularly advantageous to use not pure germanium, but rather a $Ge_xSi_{(1-x)}$ alloy with a melting temperature above the necessary diffusion temperature of 1200° C. as the diffusion source. From the status diagram pursuant to FIG. 1, it follows that in this case, the germanium content x of the alloy must be selected at x<32%. As a matter of principle, however, it is also possible to use a mixture of solid and melt as the diffusion source. In this case—as FIG. 1 shows—an alloy with an alloy ratio between x=32% and x=65% is also possible. In addition, pure melt can be used as the diffusion source.

An alloy with an alloy ratio of x=0.5, an alloy layer thickness of 160 nm and a strip width of b=10 μm has proven itself for the production of a low-loss monomode waveguide. At a diffusion time of 69 hours and a diffusion temperature of 1200° C., spot sizes with a vertical dimension of 7 μm and a horizontal dimension of 11 μm can be achieved in this manner.

I claim:

1. A method for manufacturing a low-loss optical waveguide in a lightly doped epitaxial silicon film that forms a silicon structural element having integrated electronic components, said method comprising the steps of:
   applying the lightly doped epitaxial film to a silicon substrate;
   applying a substance to the epitaxial film, said substance including germanium and having its refractive index greater than that of silicon; and
   diffusing said substance into said epitaxial film under the influence of heat.

2. The method of claim 1 wherein said substance consists essentially of germanium.

3. The method of claim 1 wherein said substance comprises a $Ge_xSi_{(1-x)}$ alloy.

4. The method of claim 1 wherein the step of applying the substance to the epitaxial film comprises the step of applying the substance in longitudinally extending strips that correspond to a longitudinal extent of the waveguide.

5. The method of claim 1 further comprising the step of applying an $SiO_2$ coating onto the surface of the epitaxial silicon film that contacts said substance before performing the step of diffusing said substance.

6. The method of claim 5 wherein the step of diffusing said substance includes exposing the silicon structural element to an elevated diffusion temperature while under an inert gas for a predetermined number of hours and further comprising the step of etching away the $SiO_2$ after completing the step of diffusing.

* * * * *